(12) United States Patent
Kjellin et al.

(10) Patent No.: US 10,402,310 B1
(45) Date of Patent: Sep. 3, 2019

(54) SYSTEMS AND METHODS FOR REDUCING STORAGE REQUIRED FOR CODE COVERAGE RESULTS

(71) Applicant: ATLASSIAN PTY LTD, Sydney (AU)

(72) Inventors: Daniel Kjellin, Sydney (AU); Kristy Louise Hughes, Sydney (AU); Bryan Paul Turner, Colorado Springs, CO (US)

(73) Assignee: ATLASSIAN PTY LTD, Sydney (AU)

( * ) Notice: Subject to any disclaimer, the term of this patent is extended or adjusted under 35 U.S.C. 154(b) by 0 days.

(21) Appl. No.: 15/942,262

(22) Filed: Mar. 30, 2018

(51) Int. Cl.
*G06F 9/44* (2018.01)
*G06F 11/36* (2006.01)
*G06F 8/71* (2018.01)
*G06F 16/13* (2019.01)

(52) U.S. Cl.
CPC ............ *G06F 11/3676* (2013.01); *G06F 8/71* (2013.01); *G06F 11/3664* (2013.01); *G06F 16/13* (2019.01)

(58) Field of Classification Search
CPC .............. G06F 11/3676; G06F 11/362; G06F 11/3664; G06F 11/3668
USPC .................................. 717/123–129, 140–142
See application file for complete search history.

(56) References Cited

U.S. PATENT DOCUMENTS

| | | | | |
|---|---|---|---|---|
| 6,701,514 B1* | 3/2004 | Haswell | .............. | G06F 11/3664 707/999.102 |
| 6,907,546 B1* | 6/2005 | Haswell | .............. | G06F 11/3684 714/38.11 |
| 7,596,778 B2* | 9/2009 | Kolawa | ............... | G06F 11/3688 717/126 |
| 8,104,017 B2* | 1/2012 | Lin | ........................... | G06F 8/10 715/700 |
| 8,276,123 B1* | 9/2012 | Deng | .................. | G06F 11/3688 714/37 |
| 8,307,351 B2* | 11/2012 | Weigert | .................. | G06F 21/16 717/131 |
| 8,359,655 B1* | 1/2013 | Pham | ..................... | G06F 21/12 370/486 |

(Continued)

OTHER PUBLICATIONS

Devadas et al, "An Observability-Based Code Coverage Metric for Functional Simulation", IEEE, pp. 1-8, 1996 (Year: 1996).*
Adler et al, "Advanced Code Coverage Analysis Using Substring Holes", ACM, pp. 37-46, 2009 (Year: 2009).*
Lyu et al, "A Coverage Analysis Tool for the Effectiveness of Software Testing", IEEE, pp. 527-535 (Year: 1994).*

(Continued)

*Primary Examiner* — Anil Khatri
(74) *Attorney, Agent, or Firm* — Hickman Palermo Becker Bingham LLP

(57) ABSTRACT

A computer implemented method comprises processing code coverage analysis data to generate a new storage version thereof. Processing comprises identifying each individual source code file in a code base and, for each individual source code file, generating a corresponding code coverage result file. The code coverage result file comprises coverage information in respect of the source code file to which the code coverage result file corresponds, the coverage information identifying which parts of the corresponding source code file were covered by the test suite, the code coverage result file being associated with its corresponding source code file. The new storage version of the code coverage analysis data is published back to the code coverage result repository as a new version and associated with the particular version of the particular source code base that was originally analyzed.

20 Claims, 4 Drawing Sheets

(56) References Cited

U.S. PATENT DOCUMENTS

| | | | | |
|---|---|---|---|---|
| 8,423,960 | B2* | 4/2013 | Farchi | G06F 11/3676 |
| | | | | 717/101 |
| 8,479,161 | B2* | 7/2013 | Weigert | G06F 11/3604 |
| | | | | 717/124 |
| 8,589,882 | B2* | 11/2013 | Shochat | G06Q 10/06 |
| | | | | 717/124 |
| 8,701,084 | B1* | 4/2014 | MacDonald | G06F 8/71 |
| | | | | 717/113 |
| 8,978,009 | B2* | 3/2015 | Mizrahi | G06F 11/3676 |
| | | | | 717/122 |
| 9,026,998 | B2* | 5/2015 | Mizrahi | G06F 11/368 |
| | | | | 717/124 |
| 9,843,624 | B1* | 12/2017 | Taaghol | H04L 67/10 |
| 9,898,393 | B2* | 2/2018 | Moorthi | G06F 11/368 |
| 10,261,890 | B2* | 4/2019 | Rao Gandham | G06F 11/3664 |
| 2013/0152047 | A1* | 6/2013 | Moorthi | G06F 11/368 |
| | | | | 717/124 |

OTHER PUBLICATIONS

Vidacs et al, "Assessing the Test Suite of a Large System Based on Code Coverage, Efficiency and Uniqueness", IEEE, pp. 13-16 (Year: 2016).*

Sampath et al, "Applying Concept Analysis to User-Session Based Testing of Web Applications", IEEE, pp. 643-658 (Year: 2007).*

Ferreira et al, "Test Coverage Analysis of UML State Machines", IEEE, pp. 284-289 (Year: 2010).*

Kapfhammer et al, "Using Coverage Effectiveness to Evaluate Test Suite Prioritizations", ACM, pp. 19-20 (Year: 2007).*

* cited by examiner

SYSTEMS AND METHODS FOR REDUCING STORAGE REQUIRED FOR CODE COVERAGE RESULTS

FIELD OF THE DISCLOSURE

The technical field of the present disclosure generally relates to improved methods, computer software, and/or computer hardware for the processing, storage, and retrieval of code coverage results.

BACKGROUND

A critical aspect of computer software development is quality assurance. For a given software project different types of testing may be appropriate, and different tools are available to assist in the testing process.

Code coverage (or test coverage) tools are one type of tool available to assist with software testing. Generally speaking, a code coverage tool is used to determine what parts of source code are covered by a given test suite and what (if any) parts of source code are not.

Complex software products can involve hundreds of thousands (or even millions) of lines of code spread across tens or hundreds of thousands of source code files. For such software products, the result set of a code coverage analysis can be large and require significant storage resources to store for review by relevant stakeholders.

This storage issue is further exacerbated in cases where code coverage analysis is repetitively performed as a source code base changes over time—e.g. each time revised source code is committed to the base in order to fix an issue or provide a new feature. In cases such as this each code coverage analysis performed generates a new set of code coverage results that need to be stored.

The approaches described in this section are approaches that are known to the inventors and could be pursued. They are not necessarily approaches that have been pursued. Therefore, unless otherwise indicated, it should not be assumed that any of the approaches described in this section qualify as prior art merely by virtue of their inclusion in this section, or that those approaches are known to a person of ordinary skill in the art.

SUMMARY

The appended claims may serve as a summary of the invention.

DETAILED DESCRIPTION

Figure 1:
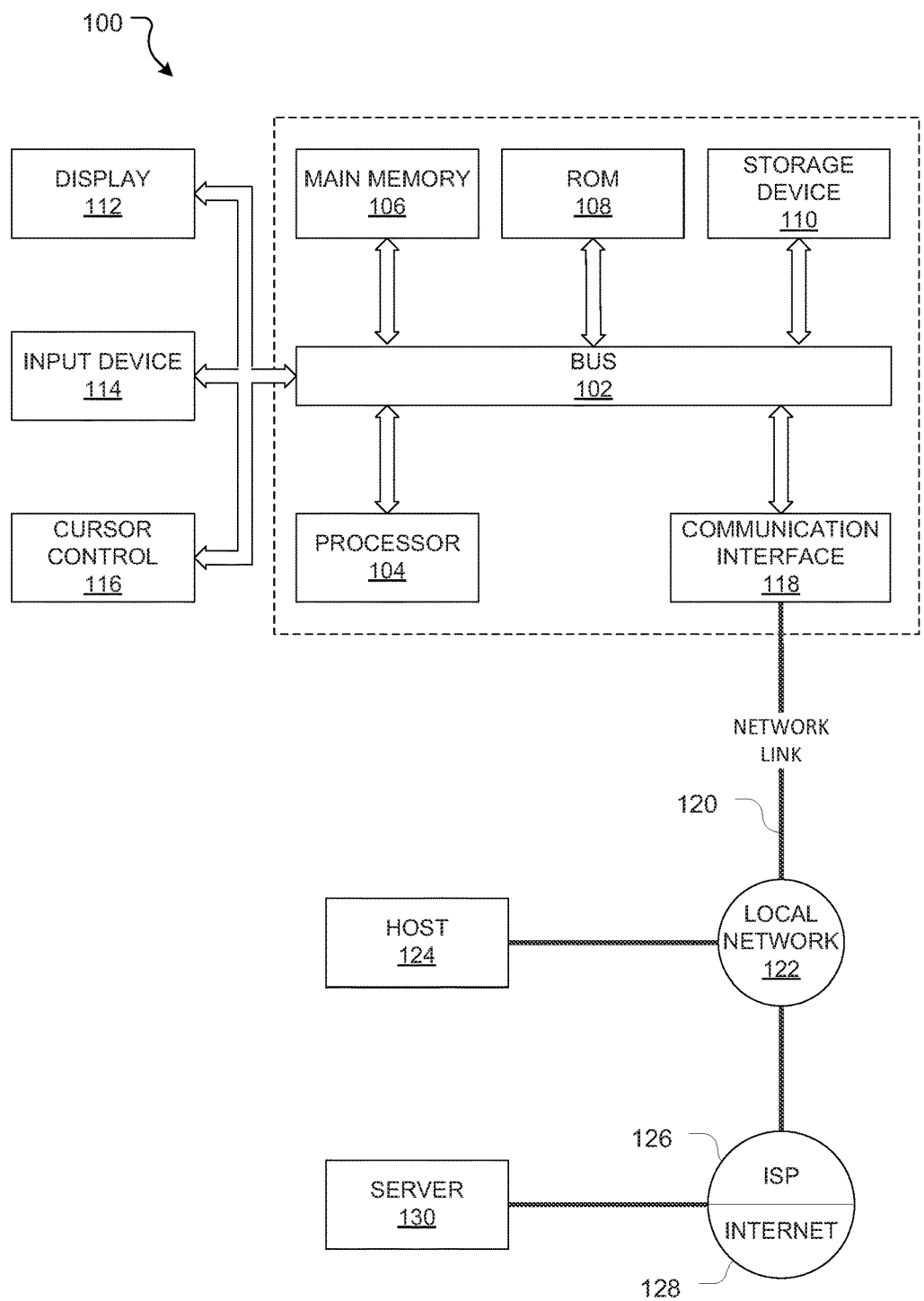
FIG. 1 illustrates an example computer processing machine.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessary obscuring.

Overview

As described above, code coverage tools are one type of tool available to assist with software testing. Generally speaking, a code coverage tool operates to measure or determine 'parts' of a source code base that are covered by a particular test suite (i.e. one or more tests that are performed on a software program). As used herein, a source code base is a set of one or more source code files (each source code file comprising one or more lines of source code) that are compiled together to provide a software product. A source code base may have different versions, reflecting changes made to the source code base over time. A test suite is a set of one or more tests that are run against the source code product to test its operation.

Different code coverage tools may analyze and report on different source code 'parts'. For example, source code 'parts' could be source code functions or subroutines, source code statements, source code branches, source code conditions, or source code lines. Accordingly, coverage information refers to information that indicates source code parts (whether lines, functions, routines, or other parts) that were covered by a test suite. Similarly, partial coverage information refers to information that indicates source code parts that were partially covered by a test suite.

Code coverage results from a given code coverage analysis can be relatively large. This is undesirable from a storage perspective, and can become a particular issue for software products with large code bases which are changed and analyzed frequently.

Consider, for example, a software product with a large source code base that is in ongoing development (e.g. for feature addition and/or bug-fixing). The code base may, for example, comprise hundreds (if not thousands) of source code files which collectively contain hundreds of thousands (if not millions) of lines of code. The code base and/or test suite for the product may be updated multiple times a day, and with each update a code coverage analysis performed to determine whether the existing test suite used to test the software product is still useful or needs to be changed. If every code coverage analysis generates a result set of, for example, 5-10 mb of raw data, and over the course of a day around 20 analyses are run, the disk space required to store the coverage results quickly becomes very large.

The inventors have identified that for some projects code coverage results from successive code coverage analyses include a large amount of data duplication. For such projects, therefore, the inventors have identified that it may be possible to reduce the storage required to store code coverage results if the data can be de-duplicated. The inventors have further identified efficient de-duplication and storage of code coverage results can be performed by leveraging functionality provided by version control systems.

The embodiments described herein provide a direct improvement to computer systems and computer technology. By reducing the quantity of digital data stored for code coverage results, the amount of memory, network bandwidth, processing time, and power usage may be reduced.

Further, the embodiments described herein offer an improvement in the overall efficiency of a computing system, resulting in a faster, more responsive computer system. Additionally, the embodiments described herein describe a technical solution to a technical problem that is rooted in computer systems and the use of networked computers. Further still, by using the embodiments described herein, the reduction in memory used results in a minimal, if any, impact to the usability of the code coverage results. These advantages and others described throughout this specification are clear improvements over existing systems that are unable to provide these improvements or advantages.

The embodiments described herein are implemented using one or more computer systems. An example computer processing system will be described with reference to FIG. 1, followed by an overview of the high-level functional systems involved in the disclosed embodiments. Example processes for generating code coverage test results, processing those results and storing them, and then retrieving stored code coverage results will then be described to illustrate particular embodiments and various features thereof.

Computer System

Embodiments and features described herein are implemented by one or more special-purpose computing devices. The special-purpose computing devices may be hard-wired to perform the techniques described, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, server systems, or any other device/system that incorporates hard-wired and/or program logic to implement the techniques.

For example, FIG. 1 is a block diagram that illustrates a computer system 100 upon which an embodiment of the invention may be implemented. For example, each of the client system 202, test system 204, and version control system 206 described below may be a separate computer system 100.

Computer system 100 includes a bus 102 or other communication mechanism for communicating information, and a hardware processor 104 coupled with bus 102 for processing information. Hardware processor 104 may be, for example, a general purpose microprocessor (e.g. a CPU) or a special purpose processor (e.g. a graphical processing unit or GPU).

Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions by the processor 104. Such instructions, when stored in non-transitory storage media accessible to processor 104, render computer system 100 into a special-purpose machine that is customized to perform the operations specified in the instructions.

Computer system 100 further includes a read only memory (ROM) 108 or other static storage device coupled to bus 102 for storing static information and instructions for processor 104. A storage device 110, such as a magnetic disk, solid state disk, or optical disk, is provided and coupled to bus 102 for storing information and instructions.

Computer system 100 may be coupled, via bus 102, to one more output devices such as a display 112 for displaying information to a computer user. Display 112 may, for example, be a cathode ray tube (CRT), a liquid crystal display (LCD), a light emitting diode (LED display), or a touch screen display. An input device 114, including alphanumeric and other keys, may be coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. Additional and/or alternative input devices are possible, for example touch screen displays.

Computer system 100 may implement the techniques described herein using customized hard-wired logic, one or more ASICs or FPGAs, firmware and/or program logic which in combination with the computer system causes or programs computer system 100 to be a special-purpose machine. In certain embodiments, the techniques herein are performed by computer system 100 in response to processor 104 executing one or more sequences of one or more instructions contained in main memory 106. Such instructions may be read into main memory 106 from another storage medium, such as storage device 110. Execution of the sequences of instructions contained in main memory 106 causes processor 104 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 110. Volatile media includes dynamic memory, such as main memory 106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 102. Transmission media can also take the form of acoustic or light waves, such as those generated during radio-wave and infra-red data communications.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card, cable modem, satellite modem, or a modem to provide a data communication connection to a corresponding type of communications or telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are example forms of transmission media.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution.

A computer system as described herein may be configured in a plurality of useful arrangements. In one approach, a data processing method comprises using a computer system, obtaining from one or more non-transitory computer-readable data storage media a copy of one or more sequences of instructions that are stored on the media and which when executed by the computer system processor cause the computer system to perform (either alone or in combination with one or more additional computer systems), the techniques that are described herein.

A computer system may take a variety of forms. For example, a client computer 106 may be a desktop computer, a laptop computer, a notebook computer, a tablet computer, a smart phone, or other computer.

System Overview

Figure 2:
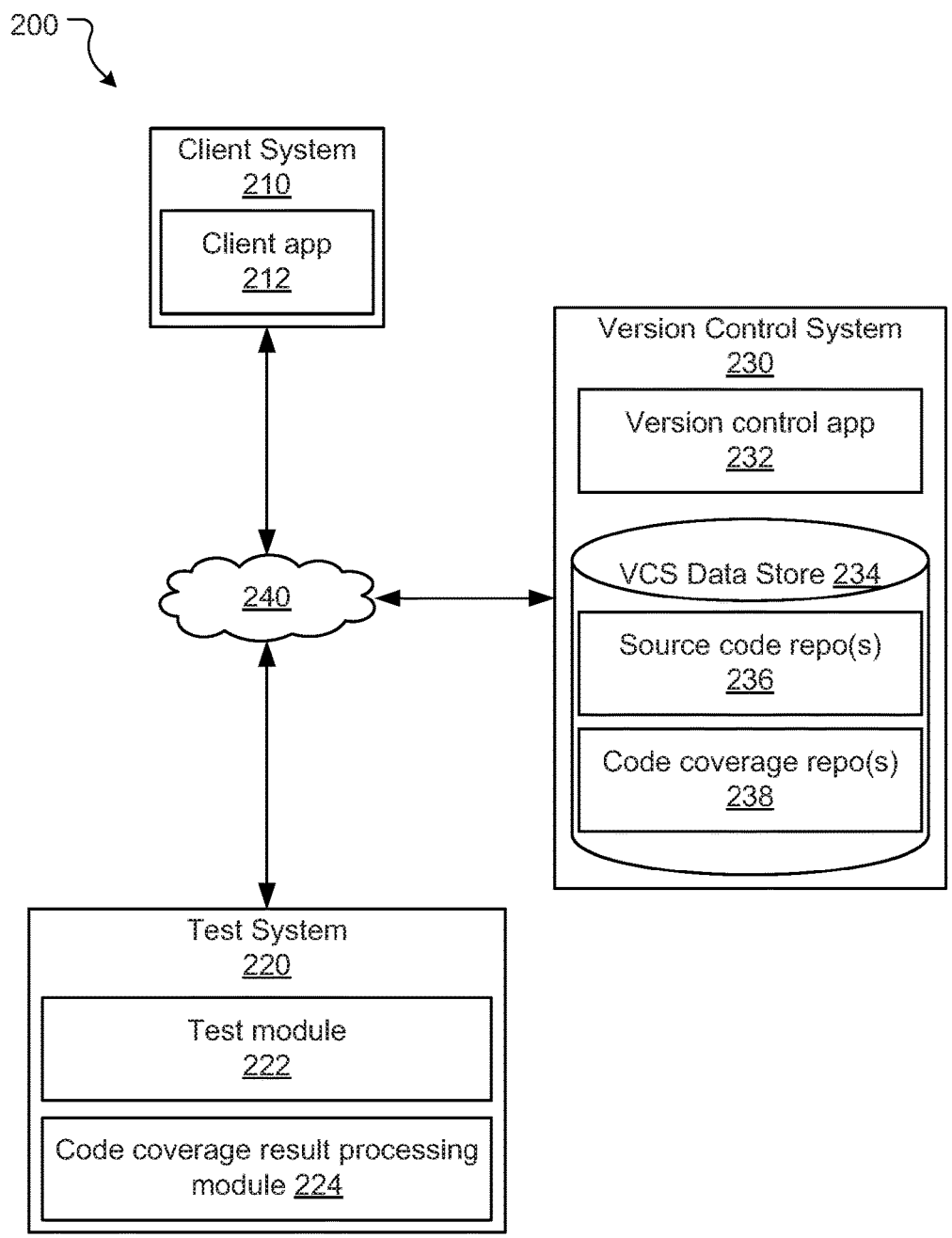
FIG. 2 is a diagram illustrating various functional systems involved in embodiments described herein.

FIG. 2 is a diagram 200 illustrating various functional systems involved in embodiments described herein. At a high level, the systems comprise a client system 210, a test system 220, and a version control system 230.

Client system 210 runs a client application 212 via which a user can interact with the test system 220 and version control system 230 to initiate code coverage analyses and access/retrieve code coverage results. Client system 210 will typically be a user computing device such as a desktop computer, a mobile phone, a tablet or the like.

Test system 220 provides server-side support for the client test application 210 and also performs code coverage analyses. To this end the test system 220 comprises a test module 222 for running a code coverage tool. As one example, the code coverage tool may be Cobertura, however alternative code coverage tools may be used (e.g. Clover, Emma, Istanbul, BlanketJs). Test system 220 also comprises a code coverage result processing module 224 for processing the code coverage results generated by the testing module 222. Test system 220 may be a stand-alone computer system or a distributed system with multiple instances concurrently running on one or more physical computer systems (e.g. servers).

Version control system 230 comprises a version control application 232 and maintains a version control system data store 234 on which data repositories are stored. In certain embodiments, the repositories comprise one or more source code repositories 236 and one or more code coverage result repositories 238. The embodiments herein will be described using Git as the version control application 232, however alternative version control systems may be used (e.g. CVS, SVN, Mercurial, Perforce). As with the test system 220, the version control system 230 may be a distributed system with multiple instances concurrently running on one or more physical computer systems (e.g. servers). In this case, data store 234 will generally be a dedicated database system running on its own computer processing system and accessible to all version control application instances. Version control system 230 may be provisioned in a public or private cloud or hosted as a 'normal' server system, and will typically be set up so as to enable concurrent access by multiple users (e.g. by via multiple client systems 210 and, in certain embodiments, the test system 220).

In the illustrated example, client system 210, test system 220, and version control system 230 communicate with one another via a communications network 240. This may be a public network (e.g. the Internet 128 shown in FIG. 1) or a local area network (e.g. network 122 of FIG. 1). In alternative embodiments, two or more of the client system 210, test system 220, and version control system 230 may communicate directly with one another rather than over a network.

As will be appreciated, FIG. 2 illustrates functional systems used in the present embodiments. These functional systems could be implemented using various hardware configurations and architectures. For example, while the client system 210 and test system 220 have been described as separate systems these may, the functions performed by the test system 220 may, in fact, be provided by the client system 210 (i.e. by installing appropriate software on the client system 210).

Generating, Processing, Storing, and Retrieving Code Coverage Test Results

This section describes various processes involved in generating and handling code coverage test results. The generation of raw code coverage test results will be described briefly with reference to FIG. 3, the processing and storage of code coverage results will be described with reference to FIG. 4, and the retrieval of code coverage results will be described with reference to FIG. 5.

Code Coverage Analysis and Results

Figure 3:
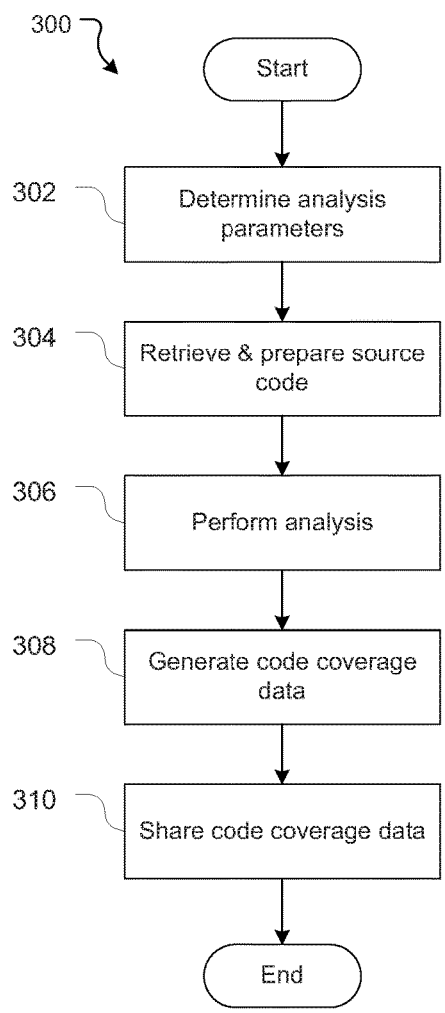
FIG. 3 is a flowchart illustrating processing blocks performed by a computer processing system to generate code coverage results.
Figure 4:
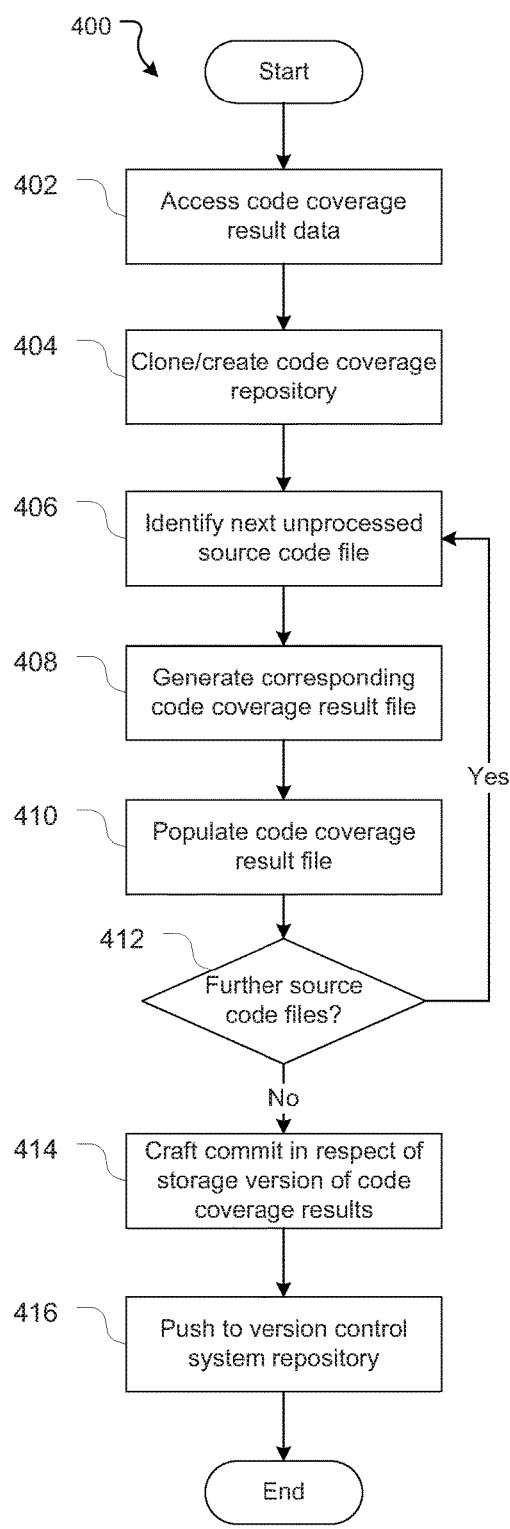
FIG. 4 is a flowchart illustrating processing blocks performed by a computer processing system to process raw code coverage results and store those results in a code coverage repository.

Turning to FIG. 3, an example process 300 for performing a code coverage analysis (and generating test results) will be described.

At 302, the test system 220 determines parameters for the code coverage analysis to be performed. The parameters define at least the source code base, a particular version of that source code base, and a particular test suite that the code coverage analysis is to be performed on. The parameters may be determined based on user input (received via a client system 210) or may be default values. For example, source code bases may be associated default test suites. In this case, when a particular source code base is selected the default test suite for that source code base is automatically selected by default.

In the present embodiment, the source code base is maintained by a version control system 230 in a source code repository 236 and the specific version/revision of a source code base is identified by a commit identifier (or commit hash).

At 304, the test system 220 retrieves the source code file(s) in respect of the particular source code base version identified at 302 (e.g. from the version control system 230) and prepares those file(s).

At 306, the test system 220 performs the code coverage analysis using a code coverage tool (e.g. Cobertura or an alternative code coverage tool). This generates raw code coverage analysis results.

At 308, the test system 220 generates code coverage data for downstream use. The code coverage data comprises the raw code coverage analysis results as generated by the code coverage tool as well as code base identification information allowing the source code base (and particular version thereof) on which the analysis was performed to be identified. Once again, the code base identification information may be the relevant commit identifier. In some embodiments, for example where default test suites are used, there is no need to identify the particular test suite against which the code coverage analysis was performed. In embodiments where it is possible to use multiple test suites to test a given code base an additional parameter will be passed which can be used to associate the test suite with the results (e.g. by inclusion of the value in the resulting file name to make it uniquely identifiable).

In certain embodiments, generating the code coverage data for downstream use involves processing the raw code coverage data to generate a wireformat (or reduced version) of that data for efficient transmission. Generally speaking, this involves processing the raw code coverage analysis results to discard data that is not of interest for downstream processing/storage and retain data that is. For example, where the code coverage tool outputs .xml data the data can be parsed by identifying tags of interest in the .xml and extracting the information associated with those tags for inclusion in the wireformat.

By way of specific example, Table A below shows an extract of .xml output generated by the Cobertura code coverage tool:

TABLE A

Example Cobertura.xml output extract

```
<?xml version="1.0"?>
<!DOCTYPE coverage SYSTEM "http://cobertura.sourceforge.net/xml/coverage-04.dtd">
<coverage line-rate="0.5769704433497537" branch-rate="0.514" lines-covered="937" lines-
valid="1624" branches-covered="257" branches-valid="500"
complexity="1.8835616438356164" version="2.0.3" timestamp="1516144939130">
    <sources>
        <source>--source</source>
        <source>/home/path/java</source>
    </sources>
    <packages>
        <package name="name" line-rate="0.6875" branch-rate="0.5641025641025641"
complexity="1.6056338028169015">
            <classes>
                <class name="com.SCFile_1" filename="com/ SCFile_1.java" line-rate="1.0"
branch-rate="1.0" complexity="1.0">
                    <methods>
                        <method name="<clinit>" signature="( )V" line-rate="1.0" branch-
rate="1.0">
                            <lines>
                                <line number="1" hits="1" branch="false"/>
                                <line number="2" hits="3" branch="false"/>
                                <line number="4" hits="6" branch="false"/>
                                <line number="7" hits="1" branch="false"/>
                                <line number="9" hits="1" branch="false"/>
                                <line number="10" hits="4" branch="false"/>
                            </lines>
                        </method>
                    </methods>
                    <lines>
                        <line number="1" hits="1" branch="false"/>
                        <line number="2" hits="3" branch="false"/>
                        <line number="4" hits="6" branch="false"/>
                        <line number="7" hits="1" branch="false"/>
                        <line number="9" hits="1" branch="false"/>
                        <line number="10" hits="4" branch="false"/>
                    </lines>
                </class>
                <class name="com.SCFile_2" filename="com/SCFile_2.java" line-rate="0.5"
branch-rate="1.0" complexity="0.0">
                    <methods>
                        <method name="<clinit>" signature="( )V" line-rate="1.0" branch-
rate="1.0">
                            <lines>
                                <line number=" 10" hits="2" branch="false"/>
                            </lines>
                        </method>
                        <method name="<init>" signature="( )V" line-rate="0.0" branch-rate="1.0">
                            <lines>
                                <line number="5" hits="0" branch="false"/>
                            </lines>
                        </method>
```

TABLE A-continued

Example Cobertura.xml output extract

```
            </methods>
            <lines>
               <line number="5" hits="0" branch="false"/>
               <line number="10" hits="2" branch="false"/>
            </lines>
         </class>
      </classes>
   </package>
</packages>
</coverage>
```

Presuming that the data of interest is which lines of which files were covered by the test suite, an example wireformat corresponding to this extract is shown in Table B:

```
{
'files':[
   10 {"SCFile_1":"1 2 3"},
   10 {"SCFile_2":"1 0"},
   ]
}
```

Table B: Example Wireformat

As can be see, the wireformat has been generated by identifying xml tags indicating the line numbers of particular source code files covered by the test suite and including that information in the wireformat. The remaining output from the code coverage tool is (for immediate purposes) disregarded, thereby reducing resources required to transmit and store this data. In alternative implementations additional (or different) data may be extracted from the raw code coverage results as desired. For example, the code coverage tool may report on partial coverage information (e.g. source code lines that are partially covered by the test suite) and this may be included in the wireformat. By way of further example, the code coverage tool may report on other aspects such as method complexity, hit count, and/other aspects which if desired can also be included in the wireformat.

At 310, the test system 220 shares the code coverage data generated at 308. The code coverage data may be shared in various ways, for example by communicating it to a client device 210, sending the data to other users, devices or services, or publishing the data for other devices/users/servers to access, posting it to a version control system.

Once the results have been shared at 310 the code coverage analysis is complete.

The person skilled in the art will recognize that there are many code coverage tools and many systems/methods available for performing a code coverage analysis. While a high level example has been described with reference to FIG. 3 many alternatives are possible. Relevant factors in this regard are that a code coverage analysis is performed on an identifiable source code base and the results of that analysis are made available for downstream use.

Code Coverage Result Preparation and Storage

Once code coverage analysis is complete, the code coverage test results are processed.

In the present embodiment the results are processed by the code coverage result processing module 224 running on the test system 220. Processing of the code coverage results (i.e. performing the processing described in relation to FIG. 4 below) could, however, be performed by alternative systems. For example, the code coverage results could be passed back to a client system 210 and processed by an appropriate application/module running on the client system 210.

At 402, code coverage data is accessed or received. In the present embodiment, the code coverage data comprises the wireformat data as described above and at least a code base identifier (identifying the source code base and version which the code coverage tool analyzed). In alternative embodiments, the raw code coverage results (generated by the code coverage tool) could be accessed/received (rather than a wire/other format) and processed directly. The code coverage data may be accessed in various ways. For example, the data may be received from a test module such as 222 (e.g. as the result of an output step such as 310 described above). Alternatively, the data may be communicated by a user via their client device 210 (who has previously run a code coverage analysis process and received the relevant data). Further alternatively, the data may be retrieved from a location at which the code coverage data has been made available.

At 404, the code base identifier received/accessed at 402 is used to identify (or create) a code coverage repository that is associated with that code base. The code coverage repository is a version control system repository in which code coverage results are stored (e.g. repository 238 of version control system 230). If no associated code coverage repository exists it is created using appropriate commands/tools provided by the version control system. A clone (e.g. a shallow clone) of the code coverage repository is then performed. Cloning the repository causes a local workspace or working directory to be created.

In some embodiments, a dedicated code coverage repository is created to correspond with each separate source code repository on which code coverage analysis is performed. For example, if a source code repository (e.g. source code repository 1) is being used to store the code base for a particular software product (product 1), code coverage results for code coverage analysis of that code base may be stored in a corresponding code coverage repository (e.g. code coverage repository 1). If a separate source code repository (e.g. source code repository 2) is being used to store the code base for a different software product (product 2), code coverage results for code coverage analysis of that code base may be stored in a separate code coverage repository (e.g. code coverage repository 2).

In other embodiments, a single version control system repository is used to store all code coverage results.

Once the code coverage data has been accessed/received, it is processed to generate a new storage version thereof. Generally speaking, the storage version of the code coverage results is a relatively light-weight (i.e. low size) version of the results which maintains selected information in respect of the code coverage analysis only. The code coverage information selected for inclusion in the storage version, and the particular format used to store that information, will differ depending on implementation and the particular code coverage tool used. Typically, though, the selected information will include coverage information: i.e. information indicating the specific parts of the source code base that were covered by the test suite. As noted above, 'parts' in this respect are whatever atomic elements of the source code that are tracked by the code coverage tool—e.g. source code lines, source code functions, or other source code elements. If the code coverage tool reports on partial coverage of source code parts, partial coverage information may also be selected for inclusion in the storage version—i.e. information indicating which parts of the source code base were partially covered by the test suite. As will be appreciated, different embodiments could record different or additional information regarding the code coverage (for example, method complexity values, hit counts etc.).

Example processing steps for generating a storage version of the code coverage results are described with respect to steps 406-412. In this example, the storage version of the code coverage results is a set of one or more code coverage result files. Each code coverage result file in the set corresponds to a source code file from the code base that was analyzed and contains selected analysis information from the code coverage results relating to that source code file.

At 406, the wireformat data accessed/received at 402 is processed to identify the next unprocessed source code file that was covered by the code coverage analysis.

At 408, a code coverage result file corresponding to the source code file identified at 406 is generated.

The code coverage result file is associated with its corresponding source code file. This association may be achieved in various ways, and may be done at the time it is generated or in a later process. For example, association of a code coverage result file with its corresponding source code file may be achieved using the name of the file, data written to the file, or file metadata. In the present embodiment, a code coverage result file is associated with its corresponding source code file using the code coverage file name. Specifically, the name of the code coverage result file includes the path and name of the corresponding source code file—e.g. "<source code path>/<source code file name>".

At 410, the code coverage result file generated at 406 is populated with selected code coverage information pertaining to its corresponding source code file. The selected code coverage information is extracted or otherwise derived from the code coverage result data accessed at 402. As noted above, the selected code coverage information may differ depending on the code coverage tool and implementation. In the example below, the selected code coverage information comprises coverage information and partial coverage information (with the parts in question being line numbers)—i.e. the selected code coverage information comprises line numbers indicating lines in source code files that were covered by the test suite and line numbers indicating lines in source code files that were partially covered by the test suite. If not already done, the populated code coverage result file can be written/saved to the working directory/workspace created as a result of cloning the code coverage repository at 404.

By way of specific example, the data of the code coverage result file may be an array including one or more integers and an optional separator character—e.g. a '|' (pipe) or any other appropriate character). In this case, integers appearing before the separator indicate line numbers of the corresponding source code file that were covered by the test suite and integers appearing after the separator character indicate line numbers of the corresponding source code file that were partially covered by the test suite. To illustrate this format, and using a '|' (pipe) as the separation character: [15,16]" would indicate that lines 15 and 16 were covered; "[15, 16, 19, 20|10]" would indicate that lines 15, 16, 19, and 20 were covered and line 10 was partially covered; "[|15,16]" would indicate that lines 15 and 16 were partially covered; [ ] would indicate no lines were covered and no lines were partially covered.

Once the selected code coverage information is written to the code coverage result file, the process continues to 412 where a determination is made as to whether the code coverage analysis covered any further source code files for which corresponding code coverage result files have not been generated. If so the process returns to 404 to select the next unprocessed source code file.

If, at 412, all source code files have been processed (and, accordingly, the set of code coverage result files is complete) the process continues to 414.

Once the storage version of the code coverage results has been generated it is saved to the version control system repository (e.g. code coverage repository 238). Example processing to achieve this is described with respect to steps 414 and 416.

At 414, a commit is crafted to save the storage version of the code coverage results back to the code coverage repository. Continuing the above example, the commit is crafted in respect of the code coverage result files that have been saved to the working directory/workspace created at 404. The commit is crafted in a way that associates it with the relevant source code base that the coverage results relate to. Where Git is used as the version control system, this association may be achieved using a tag that somehow allows for identification of the source code base. By way of specific example, a tag along the following lines may be used 'coy-SourceCodeIdentifier'. In this example, the prefix 'coy' is used to identify that the commit relates to code coverage results, and the 'SourceCodeIdentifier' element of the tag allows the related source code base to be identified. The 'SourceCodeIdentifier' element may be the commit id of the source code base which the code coverage results correspond to. In other embodiments the commit may be associated with its corresponding source code base commit using other data or other mechanisms. If the data used for the association is not data inherent in the associated source code commit, however, an additional data structure may be required in order to record the associations between source code bases (and particular revisions thereof) and their corresponding code coverage results.

At 416, the storage version of the code coverage results is pushed (or published) to the code coverage repository. Where this is the first time that code coverage results in respect of the source code base are being stored in the code coverage repository, the entire set of code coverage result files are copied to the repository. For subsequent commits of code coverage results relating to the same source code base (e.g. the results of code coverage analysis from downstream versions of the source code base), however, storage efficiencies will typically be gained due to likely duplication in the code coverage results and the operation of the version control system.

To illustrate this, consider the source code repository commits depicted in Table B below:

TABLE B

Example source code repository depiction

| Source code repo. 1<br>Commit A<br>(Commit ID: SC1-A) | Source code repo. 1<br>Commit B<br>(Commit ID: SC1-B) | Source code repo. 1<br>Commit C<br>(Commit ID: SC1-C) |
|---|---|---|
| File Name: SCFile_1<br>Content: ...<br>File Name: SCFile_2<br>Content: ... | File Name: SCFile_1<br>[No change: link to Commit A]<br>File Name: SCFile_2<br>Content: [modified content] | File Name: SCFile_1<br>[No change: link to Commit A]<br>File Name: SCFile_2<br>[No change: link to Commit B]<br>File Name: SCFile_3<br>Content: ... |

Table B illustrates a source code repository (repository 1) with three commits. In the first commit (commit A, commit id SC1-A) two files exist and, as both are new, both are saved to the repository (SCFile_1 and SCFile_2). In the second commit (commit B, commit id SC1-B), the content of SCFile_1 is unmodified but the content of SCFile_2 has been changed. For commit B, therefore, the version control system: creates a link to SCFile_1 as stored in Commit A (rather than storing a further copy of the file); stores the modified version of SCFile_2. In the third commit (commit C, commit id SC1-C), SCFile_1 remains the same (i.e. unchanged since commit A), SCFile_2 remains the same (i.e. unchanged since commit B), and SCFile_3 is newly added. For commit C, therefore, the version control system: creates a link to SCFile_1 per Commit A; creates a link to SCFile_2 per Commit B; stores a copy of SCFile_3.

If code coverage analysis was performed to determine the coverage of a particular test suite over each of the three source code base versions (i.e. the versions of Commit A, Commit B, and Commit C), the corresponding code coverage repository could look something like that illustrated in Table C:

TABLE C

Example code coverage repository depiction

| Code coverage repo. 1<br>Commit 1<br>(Commit ID: CC1-1)<br>(Tag: cov-SC1-A) | Code coverage repo. 1<br>Commit 2<br>(Commit ID: CC1-2)<br>(Tag: cov-SC1-B) | Code coverage repo. 1<br>Commit 3<br>(Commit ID: CC1-3)<br>(Tag: cov-SC1-C) |
|---|---|---|
| File name:<br>/.../SCRepo1/SCFile_1<br>Content:<br>[1 2 6 ... \| 4 5 ... ]<br>File name:<br>/.../SCRepo1/SCFile_2<br>Content: [1... \| 4 5 ... ] | File name:<br>/.../SCRepo1/SCFile_1<br>[No change: link to Commit 1]<br>File name:<br>/.../SCRepo1/SCFile_2<br>Content: [ \| 4 5 ... ] | File name:<br>/.../SCRepo1/SCFile_1<br>[No change: link to Commit 1]<br>File name:<br>/.../SCRepol/SCFile_2<br>[No change: link to Commit 2]<br>File name:<br>/ /.../SCRepo1/SCFile_3<br>Content: [4 5 ... ] |

The code coverage repository example illustrated in Table C shows three commits corresponding to the results of three code coverage analyses (performed, respectively, on the code bases of commit id SC1-A, commit id SC1-B, and commit id SC1-C). As can be seen, each code coverage repository commit is tagged with an identifier allowing the corresponding version of the source code base to be identified (while human readable commit identifiers have been used for the purposes of illustration in tables B and C commit identifiers are typically an alphanumeric hash value). Further, each code coverage result file is named in a way that allows the corresponding source code file to be identified: e.g. code coverage result file "/ . . . /SCRepo1/SCFile_1" includes both the path and file name of its corresponding source code file "SCFile_1".

Commit 1 in the code coverage repo is the first commit, and therefore both code coverage result files (/ . . . /SCRepo1/SCFile_1 and / . . . /SCRepo1/SCFile_2) are stored in the repository.

For commit 2 in the code coverage repo, the code coverage result file corresponding to source code file 1 (i.e. '/ . . . /SCRepo1/SCFile_1') is the same as in commit 1. Accordingly, the version control system generates a link to this file per the commit rather than storing another copy of it. The code coverage result file corresponding to source code file 2 (i.e. file name '/ . . . /SCRepo1/SCFile_2') has changed since commit 1, however, so the new version of '/ . . . /SCRepo1/SCFile_2' is stored in the repository.

For commit 3 in the code coverage repo, '/ . . . /SCRepo1/SCFile_1' is again unchanged, and accordingly a link is created (rather than storing another copy of the file). Similarly, '/ . . . /SCRepo1/SCFile_2' is unchanged and a link is created for this file also. '/ . . . /SCRepo1/SCFile_3' is new and is therefore saved to the repository.

As can be seen from this simple example, instead of storing three identical copies of the code coverage result file '/ . . . /SCRepo1/SCFile_1', a single copy only of that file is stored, and two links (requiring less memory) are generated. Where there are many commits and the source code base includes thousands (or tens of thousands of files) the storage savings can be considerable.

Code Coverage Result Retrieval

Figure 5:
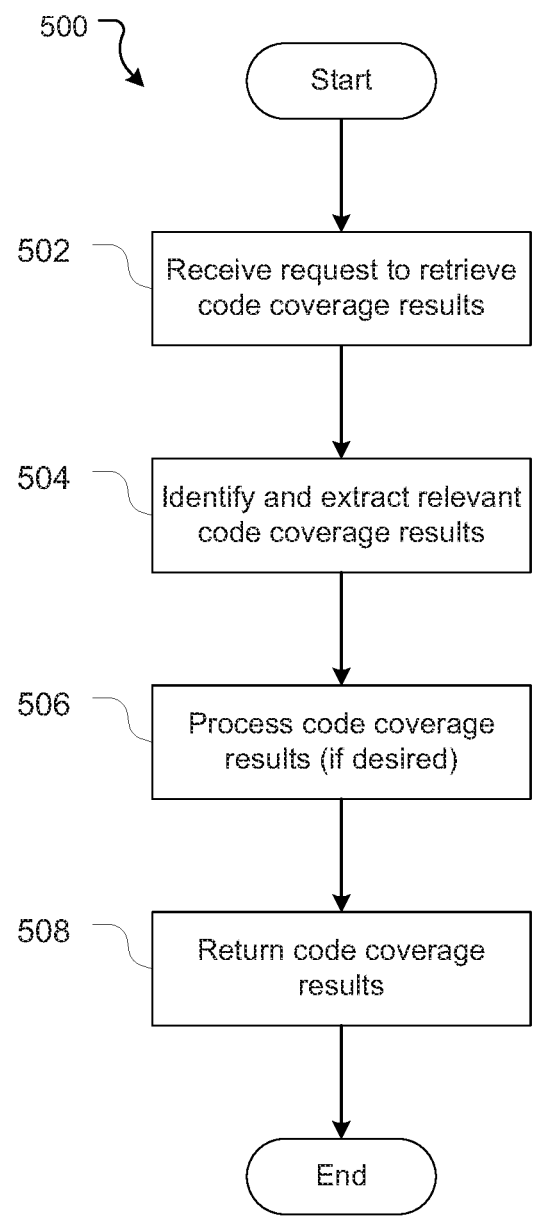
FIG. 5 is a flowchart illustrating processing blocks performed by a computer processing system to retrieve code coverage results from a code coverage repository.

Turning to FIG. 5, an example process 500 for retrieving code coverage results stored in a code coverage result repository will be described. Process 500 will be described as being performed by a client system 210 with a user using a client application (such as a web browser or other client application 212) to retrieve and view the test results. The operations could, however, be performed by a different system configured to receive and respond to retrieval requests.

At 502, a request is made to retrieve code coverage results. The request includes a source code base identifier which identifies the particular source code base of interest— i.e. the source code base for which code coverage analysis results are desired. In certain embodiments the source code base identifier is the commit ID of the source code base.

At 504, the relevant code coverage results are identified (using the code base identifier received in the request) and extracted from the code coverage repository 238. Continuing the above example, this can be done by interacting with the version control system 230 to access/view the relevant code coverage results.

At 506, and if desired, any processing of the checked-out storage version of the code coverage results is performed. This may, for example, be processing to generate visualizations of the code coverage results to allow users to easily interpret the results (e.g. to see which lines of which source code files in the source code base were covered, which were partially covered, and which were not covered).

At 508, the requested code coverage results are returned (e.g. to the client system 210 or other device/service that requested them). The results returned may be in a 'raw' format (i.e. the storage version of the results as stored in the code coverage repository 238) or a processed form (e.g. following any desired processing at 506).

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

A number of flowcharts have been provided in order to illustrate processing or functional steps. Although these flowcharts define steps in particular orders to explain various features in some cases the steps may be able to be performed in a different order. Furthermore, in some cases one or more steps may be combined into a single step, a single step may be divided into multiple separate steps, and/or the function(s) achieved by one or more of the described/illustrated steps may be achieved by one or more alternative steps.

As used herein the terms "include" and "comprise" (and variations of those terms, such as "including", "includes", "comprising", "comprises", "comprised" and the like) are intended to be inclusive and are not intended to exclude further features, components, integers or steps.

It will be understood that the embodiments disclosed and defined in this specification extend to all alternative combinations of two or more of the individual features mentioned or evident from the text or drawings. All of these different combinations constitute various alternative aspects of the embodiments.

What is claimed is:

1. A computer implemented method comprising:
   receiving code coverage analysis data in respect of a code coverage analysis performed in respect of a particular version of a particular source code base and a test suite,
   wherein the source code base is maintained in a source code repository of a version control system and comprises one or more source code files, each source code file comprising one or more parts;
   processing the code coverage analysis data to generate a new storage version thereof by: identifying, from the code coverage analysis data,
   each individual source code file in the code base that was covered by the test suite, and
   for each individual source code file, generating a corresponding code coverage result file, the code coverage result file comprising coverage information in respect of the source code file to which the code coverage result file corresponds,
   the coverage information identifying which parts of the corresponding source code file were covered by the test suite, the code coverage result file being associated with its corresponding source code file;
   cloning a previous storage version of the code coverage analysis data, the previous
   version of the code coverage analysis data maintained by a version control system in a code coverage result repository;
   obtaining a delta in coverage information between the new storage version and the
   previous storage version of the code coverage analysis data:
   publishing the delta to the code coverage result repository as a new version of the code coverage analysis data to de-duplicate code coverage analysis data: and
   associating the new version of the code coverage analysis data that has been
   committed to the code coverage result repository with the particular version of the particular source code base; and
   the source code base comprises one or more source code files and each source code file comprises one or more parts.

2. The computer implemented method according to claim 1, wherein the new version of the code coverage analysis that is committed to the code coverage result repository is associated with the particular version of the particular source code base using a commit identifier.

3. The computer implemented method according to claim 1, wherein the code coverage analysis data comprises wireformat code coverage result data, the wireformat code coverage result data being a reduced version of raw code coverage result data generated by a code coverage tool.

4. A computer implemented method comprising:
   receiving code coverage analysis data in respect of a code coverage analysis performed in respect of a particular version of a particular source code base and a test suite,
   wherein the source code base is maintained in a source code repository of a version control system;
   processing the code coverage analysis data to generate a new storage version;
   obtaining a delta between the new storage version and the previous storage version of the
   code coverage analysis data: and
   committing the delta to a code coverage result repository maintained by a version control system as a new version to de-duplicate code coverage analysis data,
   wherein the delta committed to the code coverage result repository is associated with the particular version of the particular source code base; and
   the source code base comprises one or more source code files and each source code file comprises one or more parts.

5. The computer implemented method according to claim 4, wherein the new storage version of the code coverage analysis committed to the code coverage result repository is further associated with the test suite.

6. The computer implemented method according to claim 4, wherein:
   the new storage version of the code coverage analysis data comprises coverage information identifying which parts of which source code files from the code base were covered by the test suite.

7. The computer implemented method according to claim 6, wherein the one or more parts of each source code file are line numbers.

8. The computer implemented method according to claim 4, wherein:
   the source code base comprises one or more source code files and each source code file comprises one or more parts; and
   the new storage version of the code coverage analysis data comprises partial coverage information identifying which parts of which source code files from the code base were partially covered by the test suite.

9. The computer implemented method according to claim 4, wherein:

the source code base comprises one or more source code files and each source code file comprises one or more parts, and processing the code coverage analysis data to generate the new storage version thereof comprises:

identifying, from the code coverage analysis data, each individual source code file in the code base that was covered by the test suite; and, for each individual source code file;

generating a corresponding code coverage result file, the code coverage result file comprising coverage information in respect of the source code file to which the code coverage result file corresponds, the coverage information identifying which parts of the corresponding source code file were covered by the test suite, the code coverage result file being associated with its corresponding source code file.

10. The computer implemented method according to claim 9, wherein a code coverage result file is associated with its corresponding source code file using the name of the code coverage result file.

11. The computer implemented method according to claim 4, further comprises:

cloning a previous storage version of the code coverage analysis data from the code coverage result repository.

12. The system according to claim 4, wherein one or more non-transitory computer-readable storage media storing sequences of instructions which, when executed by the one or more processors, further cause the one or more processors to:

cloning a previous storage version of the code coverage analysis data from the code coverage result repository.

13. A system comprising: one or more processors;

one or more non-transitory computer-readable storage media storing sequences of instructions which, when executed by the one or more processors, cause the one or more processors to:

receive code coverage analysis data in respect of a code coverage analysis performed in respect of a particular version of a particular source code base and a test suite, wherein the source code base is maintained in a source code repository of a version control system; process the code coverage analysis data to generate a new storage version thereof, and obtain a delta between the new storage version and the previous storage version of the code coverage analysis data:

commit the delta to a code coverage result repository maintained by a version control system as a new version to de-duplicate code coverage analysis data, wherein the delta committed to the code coverage result repository is associated with the particular version of the particular source code base; and the source code base comprises one or more source code files and each source code file comprises one or more parts.

14. The system according to claim 13, wherein the new storage version of the code coverage analysis committed to the code coverage result repository is further associated with the test suite.

15. The system according to claim 13, wherein:

the new storage version of the code coverage analysis data comprises coverage information identifying which parts of which source code files from the code base were covered by the test suite.

16. The system according to claim 15, wherein the one or more parts of each source code file are line numbers.

17. The system according to claim 13, wherein:

the source code base comprises one or more source code files and each source code file comprises one or more parts; and the new storage version of the code coverage analysis data comprises partial coverage information identifying which parts of which source code files from the code base were partially covered by the test suite.

18. The system according to claim 13, wherein:

the source code base comprises one or more source code files and each source code file comprises one or more parts, and processing the code coverage analysis data to generate the new storage version thereof comprises:

identifying, from the code coverage analysis data, each individual source code file in the code base that was covered by the test suite; and, for each individual source code file;

generating a corresponding code coverage result file, the code coverage result file comprising coverage information in respect of the source code file to which the code coverage result file corresponds, the coverage information identifying which parts of the corresponding source code file were covered by the test suite, the code coverage result file being associated with its corresponding source code file.

19. The computer implemented method according to claim 13, wherein the new version of the code coverage analysis that is committed to the code coverage result repository is associated with the particular version of the particular source code base using a commit identifier.

20. The system according to claim 13, wherein the code coverage analysis data comprises wireformat code coverage result data, the wireformat code coverage result data being a reduced version of raw code coverage result data generated by a code coverage tool.

* * * * *